United States Patent
Schultz et al.

(10) Patent No.: US 10,418,817 B2
(45) Date of Patent: Sep. 17, 2019

(54) SYNCHRONIZATION OF PARALLEL GENSETS WITH SOURCE ARBITRATION

(71) Applicant: Cummins Power Generation IP, Inc., Minneapolis, MN (US)

(72) Inventors: Mark H. Schultz, Minneapolis, MN (US); Paul R. Dahlen, Grant, MN (US)

(73) Assignee: Cummins Power Generation IP, Inc., Minneapolis, MN (US)

(*) Notice: Subject to any disclaimer, the term of this patent is extended or adjusted under 35 U.S.C. 154(b) by 406 days.

(21) Appl. No.: 15/223,975

(22) Filed: Jul. 29, 2016

(65) Prior Publication Data

US 2018/0034276 A1 Feb. 1, 2018

(51) Int. Cl.
*H02J 3/40* (2006.01)
*H02J 3/38* (2006.01)

(52) U.S. Cl.
CPC .............. *H02J 3/381* (2013.01); *H02J 3/40* (2013.01)

(58) Field of Classification Search
CPC .................................. H02J 3/381; H02J 3/40
See application file for complete search history.

(56) References Cited

U.S. PATENT DOCUMENTS

| | | | |
|---|---|---|---|
| 3,638,040 A * | 1/1972 | Mahmoud | H02J 9/061 307/43 |
| 3,714,452 A | 1/1973 | Williamson | |
| 3,748,489 A | 7/1973 | South | |
| 3,794,846 A | 2/1974 | Schlicher et al. | |
| 4,384,213 A | 5/1983 | Bogel | |
| 4,575,671 A * | 3/1986 | Lee | H02J 3/40 307/84 |
| 4,874,961 A | 10/1989 | Henderson | |
| 5,258,700 A | 11/1993 | Shimizu et al. | |
| 5,276,661 A | 1/1994 | Beg | |
| 5,592,393 A | 1/1997 | Yalla | |
| 6,194,794 B1 | 2/2001 | Lampe et al. | |
| 6,380,719 B2 * | 4/2002 | Underwood | H02J 3/38 307/85 |
| 6,501,628 B1 * | 12/2002 | Namba | H02H 3/021 307/43 |
| 6,522,030 B1 | 2/2003 | Wall et al. | |
| 6,653,751 B1 | 11/2003 | Teh Lo | |

(Continued)

OTHER PUBLICATIONS

International Search Report and Written Opinion for International Application No. PCT/US2017/044223, dated Nov. 17, 2017, 16 pages.

*Primary Examiner* — Pinping Sun
(74) *Attorney, Agent, or Firm* — Foley & Lardner LLP

(57) ABSTRACT

A method of synchronization comprises receiving, at a first generator set, data indicating a characteristic for a component of a voltage for a source, and receiving, at a second generator set, the data indicating the characteristic for the component of the voltage for the source. The method also includes calculating, by each of the first and second generator sets, a speed offset parameter and a voltage offset parameter based on the received data. The first and second generator sets are configured to receive the same data indicating the component and independently calculate the same speed offset parameter and voltage offset parameter. The method further includes controlling operation of the first and second generator sets based on the calculated speed offset and voltage offset parameters.

20 Claims, 12 Drawing Sheets

(56) References Cited

U.S. PATENT DOCUMENTS

| | | | |
|---|---|---|---|
| 6,657,416 B2 * | 12/2003 | Kern | H02J 9/066 |
| | | | 290/40 A |
| 6,724,168 B2 * | 4/2004 | Cheong | H02P 21/14 |
| | | | 318/700 |
| 6,980,911 B2 | 12/2005 | Eaton et al. | |
| 7,016,793 B2 | 3/2006 | Ye et al. | |
| 7,091,702 B2 | 8/2006 | Mrowiec et al. | |
| 7,122,916 B2 | 10/2006 | Nguyen et al. | |
| 7,171,106 B2 * | 1/2007 | Elberbaum | G08B 13/19634 |
| | | | 348/143 |
| 7,405,494 B2 | 7/2008 | Tassitino et al. | |
| 7,635,967 B2 | 12/2009 | Loucks et al. | |
| 7,656,060 B2 * | 2/2010 | Algrain | H02J 3/42 |
| | | | 307/84 |
| 7,692,335 B2 | 4/2010 | Michalko | |
| 7,816,813 B2 | 10/2010 | Yagudayev et al. | |
| 7,923,853 B2 | 4/2011 | Lewis | |
| 8,198,753 B2 | 6/2012 | Algrain | |
| 8,427,005 B1 | 4/2013 | Kisner et al. | |
| 9,019,673 B2 | 4/2015 | Varma et al. | |
| 9,136,711 B2 * | 9/2015 | Slota | H02J 3/42 |
| 9,190,848 B2 | 11/2015 | Collie | |
| 9,209,919 B2 * | 12/2015 | Hirose | H04J 3/0667 |
| 2002/0105189 A1 | 8/2002 | Mikhail | F03D 7/0224 |
| | | | 290/44 |
| 2003/0052643 A1 * | 3/2003 | Sweo | H02P 9/007 |
| | | | 318/801 |
| 2004/0021470 A1 * | 2/2004 | Adams | G01R 31/086 |
| | | | 324/522 |
| 2004/0025496 A1 | 2/2004 | Patterson, Jr. | |
| 2004/0084965 A1 * | 5/2004 | Welches | H02J 3/01 |
| | | | 307/64 |
| 2005/0012339 A1 | 1/2005 | Mikhail et al. | |
| 2005/0213272 A1 | 9/2005 | Kobayashi | |
| 2007/0297546 A1 * | 12/2007 | Shen | H04L 7/0008 |
| | | | 375/354 |
| 2008/0157538 A1 * | 7/2008 | Lewis | F03D 7/0284 |
| | | | 290/4 R |
| 2009/0055031 A1 * | 2/2009 | Slota | H02J 3/42 |
| | | | 700/287 |
| 2010/0109447 A1 | 5/2010 | Achilles et al. | |
| 2010/0148588 A1 * | 6/2010 | Algrain | H02P 5/50 |
| | | | 307/84 |
| 2010/0185336 A1 * | 7/2010 | Rovnyak | H02J 3/38 |
| | | | 700/287 |
| 2012/0175876 A1 | 7/2012 | Pendray et al. | |
| 2012/0205986 A1 * | 8/2012 | Frampton | H02J 3/381 |
| | | | 307/84 |
| 2014/0091622 A1 * | 4/2014 | Lucas | H02J 3/32 |
| | | | 307/19 |
| 2014/0249680 A1 | 9/2014 | Wenzel | |
| 2015/0035358 A1 | 2/2015 | Linkhart et al. | |
| 2015/0069858 A1 * | 3/2015 | Frampton | H02J 3/44 |
| | | | 307/127 |
| 2015/0076903 A1 * | 3/2015 | Kanayama | H02J 3/40 |
| | | | 307/24 |
| 2015/0097437 A1 | 4/2015 | Votoupal et al. | |
| 2015/0295581 A1 * | 10/2015 | Shi | H02J 3/40 |
| | | | 700/287 |
| 2015/0304971 A1 * | 10/2015 | Shor | H04W 56/001 |
| | | | 370/350 |
| 2015/0318705 A1 | 11/2015 | Lucas et al. | |
| 2016/0285265 A1 * | 9/2016 | Lin | H02J 3/006 |
| 2017/0214249 A1 * | 7/2017 | Seeley | H02J 3/44 |

* cited by examiner

US 10,418,817 B2

SYNCHRONIZATION OF PARALLEL GENSETS WITH SOURCE ARBITRATION

FIELD

The present disclosure relates to systems and methods for synchronizing generator set(s).

BACKGROUND

Generator sets (gensets), such as alternating current (AC) gensets, may provide electrical power to loads when power is unavailable from an electric utility or another power source (e.g., a solar generator set, a fuel cell generator set, a wind generator set, etc.). When the utility power returns, the load may be transferred back to the utility. Further, gensets may supplement power of the utility when demand of the load exceeds the supply of the utility and some load is removed from the utility. When adding the gensets to the utility to supplement or transfer loads, a small difference in the frequency, phase, and/or magnitude between the gensets and the utility may create large over-current. Therefore, before adding gensets to supplement or transfer loads, the frequency, phase, and magnitude of the gensets may need to be synchronized to those of the utility to avoid disruption to the loads. Besides synchronization between gensets and utilities, synchronization may be desired among two or more gensets. For example, a group of paralleled gensets may be employed to supply large amount of power and the AC output of each genset may need to be synchronized to one another.

SUMMARY

One embodiment of the disclosure relates to a method of synchronization. The method comprises receiving, at a first generator set, data indicating a characteristic for a component of a voltage for a source, and receiving, at a second generator set, the data indicating the characteristic for the component of the voltage for the source. The method also includes calculating, by each of the first and second generator sets, a speed offset parameter and a voltage offset parameter based on the received data. The first and second generator sets are configured to receive the same data indicating the component and independently calculate the same speed offset parameter and voltage offset parameter. The method further includes controlling operation of the first and second generator sets based on the calculated speed offset and voltage offset parameters.

Another embodiment of the disclosure relates to a method of synchronizing a group of paralleled generator sets. The method comprises receiving, at a first generator set of the group, a first synchronization request for synchronizing a first output of the first generator set to a first voltage component of a first source, broadcasting, at the first generator set, a first identifier of the first source to at least a second generator set of the group, and receiving, at the first generator set, a second identifier of a second source from the second generator set. The second generator set has received a second synchronization request for synchronizing a second output of the second generator set to a second voltage component of the second source. The method further includes selecting, at the first generator set, a source from the first source and the second source based on a characteristic of the first generator set and the second generator set, and synchronizing the first output voltage of the first generator set and the second output voltage of the second generator set to the selected source.

Still another embodiment of the disclosure relates to a generator set including a communication interface structured to receive, over a network, a synchronization request for synchronizing an output voltage of the generator set to a voltage of a source, and data indicating magnitude, frequency, and phase of the voltage of the source. The generator set also includes a magnitude synchronization circuit structured to calculate a voltage offset parameter based on the received data and to control operation of the generator set based on the calculated voltage offset parameter, and a frequency/phase synchronization circuit structured to calculate a speed offset parameter based on the received data and to control operation of the generator set based on the calculated speed offset parameter. The received data is transmitted to one or more other generator sets each configured to calculate the speed offset and the voltage offset using the received data.

These and other features, together with the organization and manner of operation thereof, will become apparent from the following detailed description when taken in conjunction with the accompanying drawings.

DETAILED DESCRIPTION

Figure 1:
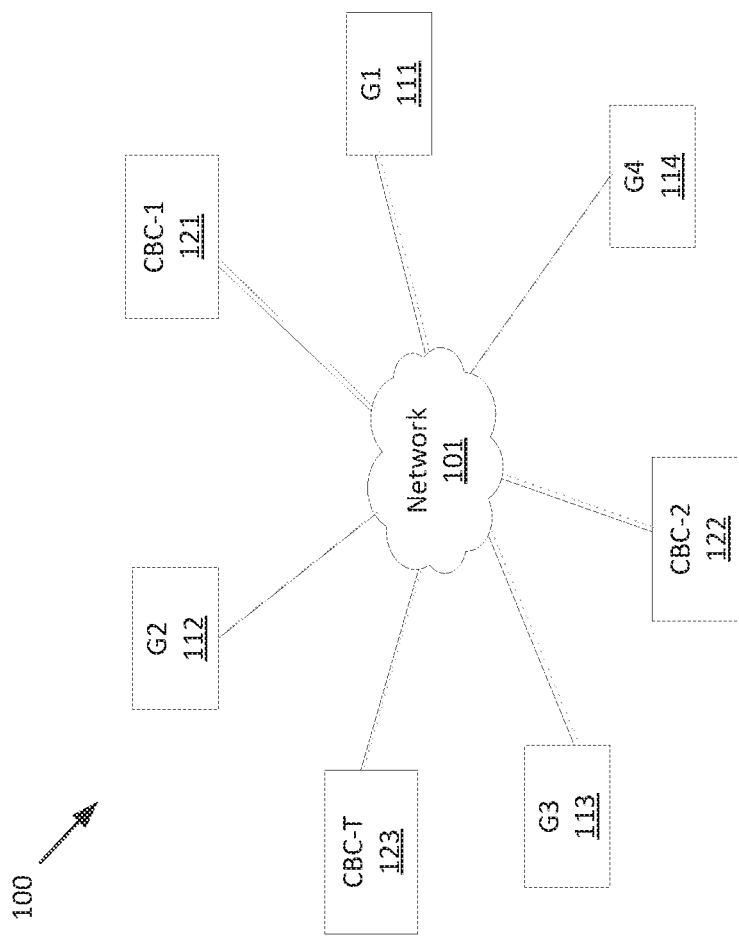
FIG. 1 is a schematic diagram of communication connections among a synchronization system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

When adding gensets to a power grid or transferring load, a small difference in the frequency, phase, or magnitude between the gensets and the power grid may create large over-current. Therefore, before adding gensets or transferring load, the frequency, phase, and/or magnitude of the gensets are synchronized to those of the power grid to avoid disruption. Besides synchronization between gensets and utilities, synchronization may be desired among a group of paralleled gensets employed to supply power to one or more loads. A separate master control circuit may be used to facilitate the synchronization. The master control circuit may sense the frequency/phase/magnitude differences between the gensets and the grid, use a proportional integral (PI) control loop to calculate offsets for speed and voltage, and send the calculated offsets to the appropriate gensets. Upon receiving the offset, the gensets may run another synchronization process on their own to match the power grid. Thus, two separate synchronization circuits/processes are used, one in the gensets for single genset synchronizing and the other in the master control circuit for master synchronizing. The use of a master control circuit introduces a single point of failure in the system and adds complexity to the system architecture.

Referring to the figures generally, systems and methods for synchronization are disclosed herein. In some embodiments, a genset receives a synchronization request, which identifies a source to which to synchronize. The genset also receives data indicating a characteristic for a component of a voltage (e.g., magnitude, frequency, and/or phase of voltage) of the source and runs a synchronization process to match the output of the genset to the source. In this method, synchronization requests and information of the source voltage are obtained from the appropriate node on the network (e.g., a connection circuit breaker controller) and this information is used as feedback for a single set synchronizing circuit within the genset(s). Using such a method, a separate master synchronizer on the master control circuits may be eliminated and/or tuning of the PI control loop of the master synchronizer may be avoided.

Systems and methods for synchronizing a group of paralleled generator sets with a source arbitration scheme are also disclosed herein. A group of paralleled gensets may be used to supply power, and different gensets may receive synchronization requests for synchronizing to difference sources. In the method, each genset in the group may broadcast to other gensets in the group information regarding the source to which it is requested to synchronize. Each genset may also keep a list of sources for all the gensets. The group of gensets may collectively select which source to synchronize to according to certain rules.

Referring to FIG. 1, communication connections among components of a synchronization system 100 are shown. The synchronization system 100 may include a plurality of gensets 111, 112, 113, and 114 and a plurality of circuit breaker controllers 121, 122, and 123 in communication with each other over a network 101. Although four gensets and three circuit breaker controllers (CBC) are shown in FIG. 1, the synchronization system 100 may include any suitable number of gensets and circuit breaker controllers.

Each of the gensets 111, 112, 113, and 114 may include a prime mover (e.g., an engine) that is connected to a generator. The engine can be any type of engine that is suitable for producing mechanical power including, but not limited to, a diesel engine, a natural gas engine, and a gasoline engine, etc. The generator can be any type of generator that is suitable for converting the mechanical power produced by the prime mover to electrical power, including, but not limited to, an alternator. Each of the gensets may be configured to generate power in a three-phase alternating current (AC) or other type of AC. Each of the gensets 111, 112, 113, and 114 may further include a communication interface appropriate or compatible with the network 101. The communication interface may be a modem, a network interface card (NIC), or a wireless transceiver, etc. Each genset may receive and transmit information for synchronization via the communication interface over the network 101.

Each of the circuit breaker controllers 121, 122, and 123 may be structured to sense a characteristic for a component (e.g., the magnitude, frequency, and phase) of an alternating voltage and transmit/receive information for synchronization. Each circuit breaker controller may be located on a network node which may include a processor, a memory, and a communication interface. Each circuit breaker controller may be implemented in various forms of circuitry, including hardware, firmware, special purpose processors, or a combination thereof. In some embodiments, the circuit breaker controller is implemented on a computer platform having a processor, a memory, and a communication interface. The processor may be a general-purpose processor, an application specific integrated circuit (ASIC), one or more field programmable gate arrays (FPGAs), a digital signal processor (DSP), a group of processing components, or other suitable electronic processing components. The memory may store data and/or code for facilitating the function of the master control circuit. The communication interface may be a modem, a network interface card (NIC), or a wireless transceiver, etc. for receiving/transmitting information for synchronization over the network 101.

The network 101 allows communication among the gensets 111, 112, 113, 114 and the circuit breaker controllers 121, 122, and 123. The network 101 may be any type of suitable network. In some embodiments, the network 101 may be structured as a wireless network, such as Wi-Fi, WiMax, Geographical Information System (GIS), Internet, Radio, Bluetooth, Zigbee, satellite, radio, Cellular, Global System for Mobile Communications (GSM), General Packet Radio Service (GPRS), Long Term Evolution (LTE), etc. In some embodiments, the network 101 may be structured as a wired network or a combination of wired and wireless protocol. For example, a wired connection may include a serial cable, a fiber optic cable, an SAE J1939 bus, a CAT5 cable, a USB cable, a Firewire (1394 connectivity) cable, mod bus, serial communication chain, or any other form of wired connection. In some embodiment, the network 101 may be a controller area network (CAN) bus including any number of wired and wireless connections that provides the exchange of signals, information, and/or data between the gensets 111, 112, 113, 114 and the master control circuits 121, 122, and 123. In some embodiments, the network 101 may be a local area network (LAN), a wide area network (WAN), etc.

Figure 2:
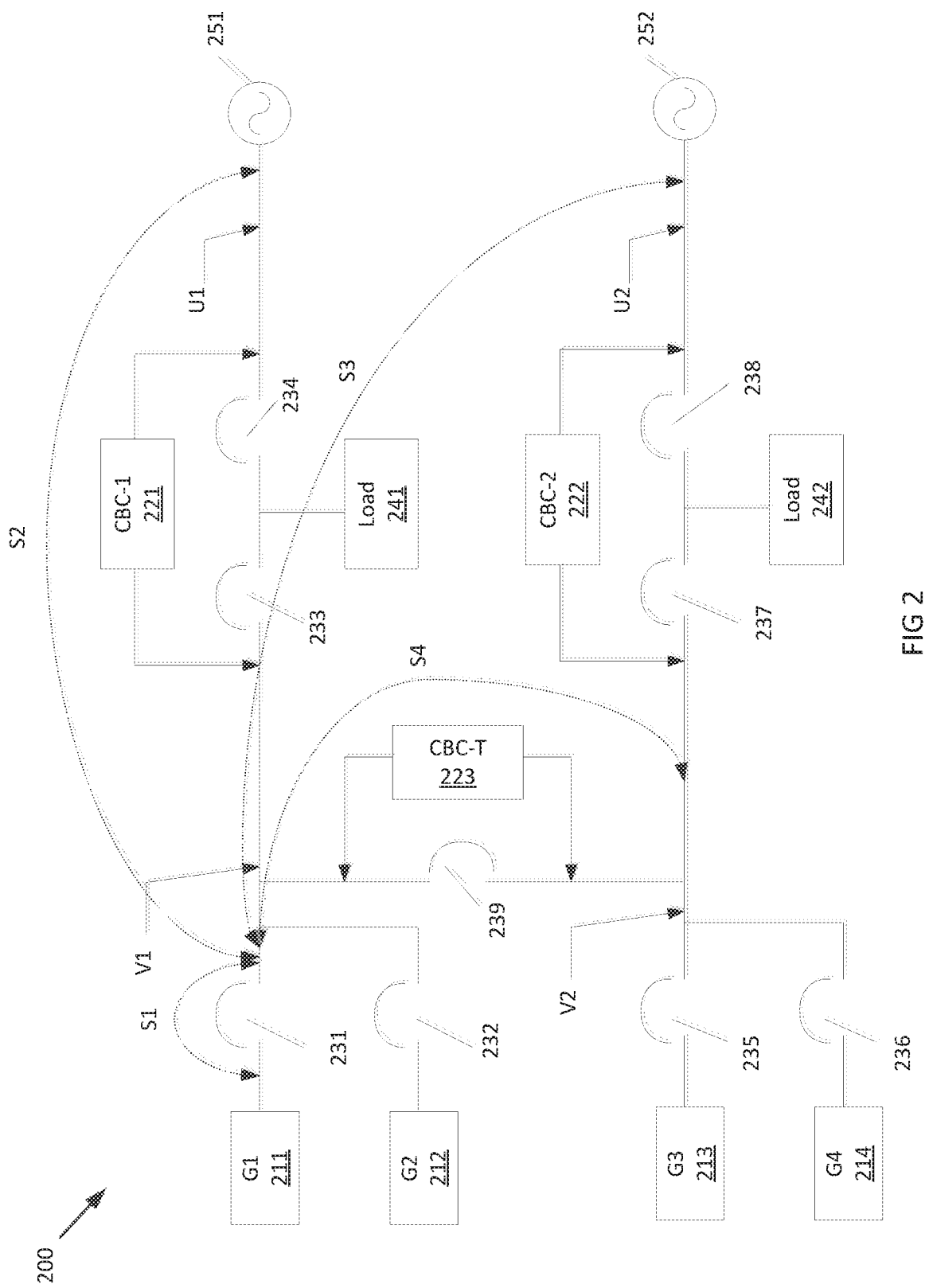
FIG. 2 is a schematic diagram of electrical connections among the synchronization system.

Referring to FIG. 2, electrical connections among the synchronization system 200 are shown. Genset 211, 212, 213, and 214 in synchronization system 200 may correspond to the gensets 111, 112, 113, and 114 in FIG. 1, and circuit breaker controllers 221, 222, and 223 to the circuit breaker controllers 121, 122, and 123 in FIG. 1. The system 200 may further include utilities 251 and 252, circuit breakers 231-239, and loads 241 and 242. It shall be appreciated that the system 200 may include any suitable numbers of utilities, circuit breakers, and loads arranged in any suitable manners.

Each of the utilities 251 and 252 may provide, for example, a three-phase AC voltage with appropriate electrical frequency, e.g., 50 Hz or 60 Hz. Each of the loads 241 and 242 may be one or more devices that rely on electrical power to operate, e.g., lights, motors, etc. The loads may be structured to receive power in a three-phase AC voltage. Each of the circuit breakers 231-239 may be on a closed state or an open state. When a circuit breaker is closed, an electrical connection may be formed between the two sides of the circuit breaker. When a circuit breaker is open, the two sides of the circuit breaker may be electrically disconnected.

Components of the synchronization system 200 are connected through a power grid. The power grid includes a first genset bus V1, a second genset bus V2, a first utility bus U1, and a second utility bus U2. The first genset 211 is connected to the first genset bus V1 via the circuit breaker 231. In particular, the circuit breaker 231 is disposed between the first genset 211 and the first genset bus V1. When the circuit breaker 231 is closed, the output of the first genset 211 is connected to the first genset bus V1. When the circuit breaker 231 is open, the first genset 211 is disconnected to the first genset bus V1. The circuit breaker 232 is disposed between the second genset 212 and the first genset bus V1 and connects the second genset 212 to the first genset bus V1 when closed. The first utility 251 is connected to the first utility bus U1. The circuit breaker 233 is disposed between the first genset bus V1 and the first load 241. When the circuit breaker 233 is closed, the voltage on the first genset bus V1 is provided to the first load 241. When the circuit breaker 233 is open, the first genset bus V1 is disconnected to the first load 241. The circuit breaker 234 is disposed between the first utility bus U1 and the first load 241. When the circuit breaker 234 is closed, the voltage on the first utility bus U1 is provided to the first load 241. When the circuit breaker 234 is open, the first utility bus U1 is disconnected to the first load 241.

The first circuit breaker controller 221 is disposed between the first genset bus V1 and the first utility bus U1, across the circuit breakers 233 and 234. The first circuit breaker controller 221 may be structured to sense the characteristics (e.g., frequency, phase, and/or magnitude) of the voltage on the first genset bus V1 and the voltage/current on the first utility bus U1. In some embodiments, the first circuit breaker controller 221 may include a bus sensor, for example, a voltage sensor, structured to sense the alternating voltage on the buses. The first circuit breaker controller 221 may be further structured to selectively open or close the circuit breakers based on the sensed voltage. In some embodiments, the first circuit breaker controller 221 may further include a breaker driver structured to operate the circuit breakers to open and close a set of contacts. The breaker driver may respond to a control signal from the first circuit breaker controller 221 and convey a status signal back to the first circuit breaker controller 221 indicating the state of the contacts, i.e., open or closed.

The third genset 213 is connected to the second genset bus V2 via the circuit breaker 235. In particular, the circuit breaker 235 is disposed between the third genset 213 and the second genset bus V2. When the circuit breaker 235 is closed, the output of the third genset 213 is connected to the second genset bus V2. When the circuit breaker 235 is open, the third genset 213 is disconnected to the second genset bus V2. The circuit breaker 236 is disposed between the fourth genset 214 and the second genset bus V2 and connects the fourth genset 214 to the second genset bus V2 when closed.

The second utility 252 is connected to the second utility bus U2. The circuit breaker 237 is disposed between the second genset bus V2 and the second load 242. When the circuit breaker 237 is closed, the voltage on the second genset bus V2 is provided to the second load 242. When the circuit breaker 237 is open, the second genset bus V2 is disconnected to the second load 242. The circuit breaker 238 is disposed between the second utility bus U2 and the second load 242. When the circuit breaker 238 is closed, the voltage on the second utility bus U2 is provided to the second load 242. When the circuit breaker 238 is open, the second utility bus U2 is disconnected to the second load 242.

The second circuit breaker controller 222 is disposed between the second genset bus V2 and the second utility bus U2, across the circuit breakers 237 and 238. The second circuit breaker controller 222 may be structured to sense the characteristics (e.g., frequency, phase, and/or magnitude) of the voltage on the second genset bus V2 and the second utility bus U2. In some embodiments, the second circuit breaker controller 222 may include a bus sensor, for example, a voltage sensor, structured to sense the alternating voltage on the buses. The second circuit breaker controller 222 may be further structured to selectively open or close the circuit breakers based on the sensed voltages. In some embodiments, the second circuit breaker controller 222 may further include a breaker driver structured to operate the circuit breakers to open and close a set of contacts. The breaker driver may respond to a control signal from the second circuit breaker controller 222 and convey a status signal back to the second circuit breaker controller 222 indicating the state of the contacts, i.e., open or closed.

The third circuit breaker controller 223 is disposed between the first genset bus V1 and the second genset bus V2, across the circuit breaker 239. The circuit breaker 239 can connect two paralleled groups together, i.e., group one consisting of gensets 211 and 212 and group two consisting of gensets 213 and 214. In particular, when the circuit breaker 239 is closed and circuit breakers 231, 232, 235, and 236 are closed, the four gensets 211 through 214 are paralleled together and can synchronize to U1 or U2. If the circuit breaker 239 is open, the two groups of paralleled gensets can operate separately. The third circuit breaker controller 223 is structured to sense the characteristics (e.g., frequency, phase, and/or magnitude) of the voltage on the first genset bus V1 and the second genset bus V2. In some embodiments, the third circuit breaker controller 223 may include a bus sensor, for example, a voltage sensor, structured to sense the alternating voltage on the buses. The third circuit breaker controller 223 may be further structured to selectively open or close the circuit breakers based on the sensed voltages. In some embodiments, the third circuit breaker controller 223 may further include a breaker driver structured to operate the circuit breakers to open and close a set of contacts. The breaker driver may respond to a control signal from the third circuit breaker controller 223 and convey a status signal back to the third circuit breaker controller 223 indicating the state of the contacts, i.e., open or closed.

In operation, four synchronizing options are possible for each of the gensets 211, 212, 213, and 214 in the synchronization system 200 shown in FIG. 2. For example, for the first genset 211, the options S1, S2, S3, and S4 to synchronize to V1, V2, U1, or U2 are shown in dashed lines. Similar options apply to other gensets 212, 213, and 214. As used herein, "synchronization" means matching characteristics (e.g., frequency, phase, and/or magnitude) of the output voltage of a genset to those of a source, for example, a utility or another genset. In some implementations, the match may not be an exact match of the characteristics. For example, in some implementations, the characteristics may be matched to within a threshold. In the first scenario S1, the first genset 211 is to be synchronized to the power on the first genset bus V1. S1 may correspond to a situation in which the first genset 211 is joining the second genset 212 as a parallel genset for providing power. Before synchronization is achieved, the circuit breaker 231 is open. The first genset 211 may sense the voltage on the first genset bus V1 and run a local synchronization process that matches the characteristics of its output to those on the first genset bus V1. The local synchronization process will be discussed in more detail below. After the synchronization is achieved, the circuit breaker 231 may be closed. In other embodiments, a circuit breaker controller may be disposed across the circuit breaker 231 and send data indicating the characteristic of the voltage on the first genset bus V1 to the first genset 211 for synchronization.

In the second scenario S2, the first genset 211 is to be synchronized to the electrical power on the first utility bus U1. In some embodiments, S2 corresponds to a situation in which the power from the first utility 251 returns and the first load 241 is transferred back to the first utility 251. In other embodiments, S2 corresponds to a situation where the first load 241 is to be transferred off the first utility 251 and supported by the first genset 211 (and the second genset 212). In yet other embodiments, S2 corresponds to a situation where the first genset 211 (and the second genset 212) is supplementing the first utility 251 to supply power to the first load 241; the first genset 211 is to be synchronized to the first utility bus U1. In particular, the first circuit breaker controller 221 may initiate a synchronization request and send the request to first genset 211 and the second genset 212 over the communication network 101. Before the synchronization is achieved, the circuit breakers 231, 232, and 233 are closed, and the circuit breakers 234 and 239 are open. The first genset 211 and the second genset 212 are providing power to the first load 241. The first circuit breaker controller 221 may o send data regarding the characteristics of the voltage/current on the first utility bus U1 to the first genset 211 and the second genset 212. Upon receiving the synchronization request, the first genset 211 and the second genset 212 may each run a synchronization process on the genset that matches the characteristics of the output of the corresponding genset to those on the first utility bus U1. The synchronization process will be discussed in more detail below. After the synchronization is achieved, the first circuit breaker controller 221 may close the circuit breaker 234. Similar operations can be performed when the first load 241 is to be transferred off the first utility 251 and supported by the first genset 211 and the second genset 212, or when the first genset 211 and the second genset 212 are supplementing the first utility 251 to supply power to the first load 241. In some embodiments, the first circuit breaker controller 221 may compare the voltage on the first genset bus V1 with the voltage on the first utility bus U1 and determine that synchronization has been achieved when the differences between the characteristics of the voltage on the first genset bus V1 and those of the voltage on the first utility bus U1 are within a particular tolerance or threshold.

Because more than one genset is to be synchronized, synchronization and load sharing may be in operation at the same time. In some implementations, the first circuit breaker controller 221 may drive analog load share lines of the paralleled gensets 211 and 212 and/or generate digital load share commands for transmitting to the gensets 211 and 212. When driving the load share lines or generating the load share commands, the first circuit breaker controller 221 may offset the speed and magnitude of the gensets 211 and 212 to match the first utility bus U1 while having the load share control operate at the same time.

In the third scenario S3, the first genset 211 is to be synchronized to the voltage on the second utility bus U2. S3 may correspond to a situation in which the power from the second utility 252 returns and the second load 242 is transferred back to the second utility 252. Or, in reverse, where the second load 242 is to be transferred off the second utility 252 and supported by the first genset 211 (and the second genset 212), or where the first genset 211 and the second genset 212 are supplementing the second utility 252 to supply power to the second load 242; the first genset 211 is to be synchronized to the second utility bus U2. In particular, the second circuit breaker controller 222 may initiate a synchronization request and send the request to first genset 211 and the second genset 212 over the communication network 101. Before the synchronization is achieved, the circuit breakers 231, 232, 237, and 239 are closed, and the circuit breaker 238 is open. Each of the circuit breakers 235 and 236 can be either closed or open. If the circuit breaker 235 is closed, the genset 213 would participate in synchronizing like the first genset 211. If the circuit breaker 236 is closed, the genset 214 would participate in synchronizing like the first genset 211. The second circuit breaker controller 222 may also send data regarding the characteristics of the voltage on the second utility bus U2 to the first genset 211 and the second genset 212. Upon receiving the synchronization request, the first genset 211 and the second genset 212 may each run a synchronization process on the genset that matches the characteristics of the output of the corresponding genet to those on the second utility bus U2. The synchronization process will be discussed in more detail below. After the synchronization is achieved, the second master control circuit 222 may close the circuit breaker 238. Similar operations can be performed when the second load 242 is to be transferred off the second utility 252 and supported by the first genset 211 and the second genset 212, or when the first genset 211 and the second genset 212 are supplementing the second utility to supply power to the second load 242. In some embodiments, the second circuit breaker controller 222 may compare the voltage/current on the first genset bus V1 with the voltage on the second utility bus U2 and determine that synchronization has been achieved when the differences between the characteristics of the voltage on the first genset bus V1 and those of the voltage on the second utility bus U2 are within some predetermined tolerance differences. In further embodiments, synchronization and load sharing may be operated at the same time by the second circuit breaker controller 222, in the same manner as discussed above in the second scenario.

In the fourth scenario S4, the first genset 211 is to be synchronized to the power on the second genset bus V2. S4 may correspond to a situation in which the gensets 211 and 212 are joining the gensets 213 and 214 as a group of parallel gensets to provide power to both the first load 241 and the second load 242, or one of the first load 241 and the second load 242 (e.g., leave the other to the utility grid). In particular, the third circuit breaker controller 223 may initiate a synchronization request and send the request to first genset 211 and the second genset 212 over the communication network. Before the synchronization is achieved, the circuit breakers 231, 232, 235, and 236 are closed, and the circuit breakers 234, 238, and 239 are open.

Each of the circuit breakers 233 and 237 can be either closed or open. The third circuit breaker controller 223 may send data regarding the characteristics of the voltage on the second genset bus V2 to the first genset 211 and the second genset 212. Upon receiving the synchronization request, the first genset 211 and the second genset 212 may each run a local synchronization process on the genset that matches the characteristics of the output of the corresponding genset to those on the second genset bus V2. The synchronization process will be discussed in more detail below. After the synchronization is achieved, the third circuit breaker controller 223 may close the circuit breaker 239, thereby adding the first genset 211 and the second genset 212 to the third genset 213 and the fourth genset 214 without disrupting the operation of the first load 241 and the second load 242. In some embodiments, the third circuit breaker controller 223 may compare the voltage on the first genset bus V1 with the voltage on the second genset bus V2 and determine that synchronization has been achieved when the differences between the characteristics of the voltage on the first genset bus V1 and those on the second genset bus V2 are within some predetermined tolerance differences. In further embodiments, load sharing may be operated through network connections between the gensets. It shall be understood that the options described herein are for illustration. Different options are available for different arrangements of the electrical circuits.

Figure 3:
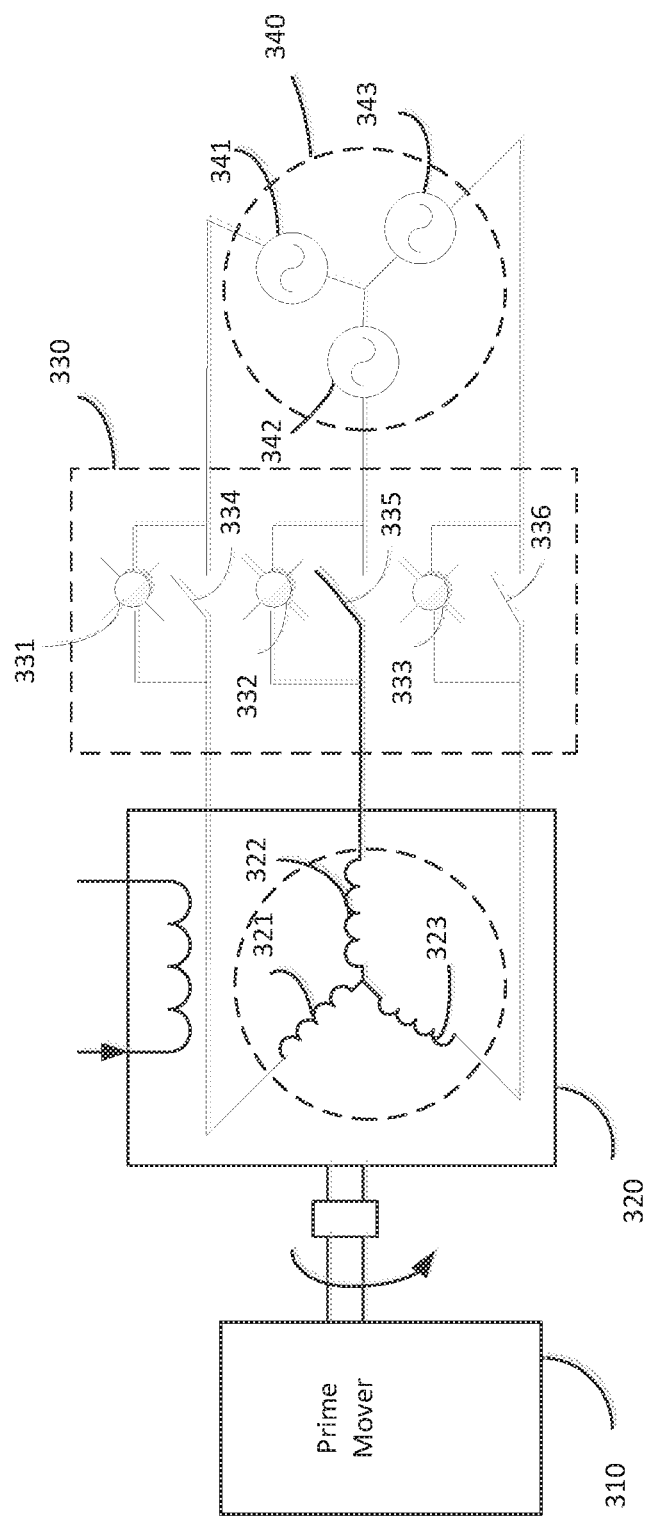
FIG. 3 is a schematic diagram illustrating a line synchronization scheme.

Referring to FIG. 3, a schematic diagram illustrating a line synchronization scheme is shown. A genset that includes a prime mover (e.g., an engine) and a generator (e.g., a synchronous generator) 320 is to be synchronized to a source 340. In some embodiments, the generator 320 and the source 340 both output three-phase alternating voltages. The first phase 321 of the generator 320 is connected to the first phase 341 of the source 340 through a first contactor 334 of a three-phase switch 330. The second phase 322 of the generator 320 is connected to the second phase 342 of the source 340 through a second contactor 335 of the switch 330. The third phase 323 of the generator 320 is connected to the third phase 343 of the source 340 through a third contactor 336 of the switch 330. In some embodiments, the switch 330 may also include a first lamp 331 connected in parallel with the first contactor 334, a second lamp 332 connected in parallel with the second contactor 332, and a third lamp 333 connected in parallel with the third contactor 336. As used herein, synchronizing the output voltage of the generator 320 to the source 340 means matching the characteristics (e.g., frequency, phase, and/or magnitude) of the phases 321, 322, and 323 to those of the phases 341, 342, and 343. In some embodiments, the switch may include different indicators other than lamps for one or more of the phases.

Figure 4:
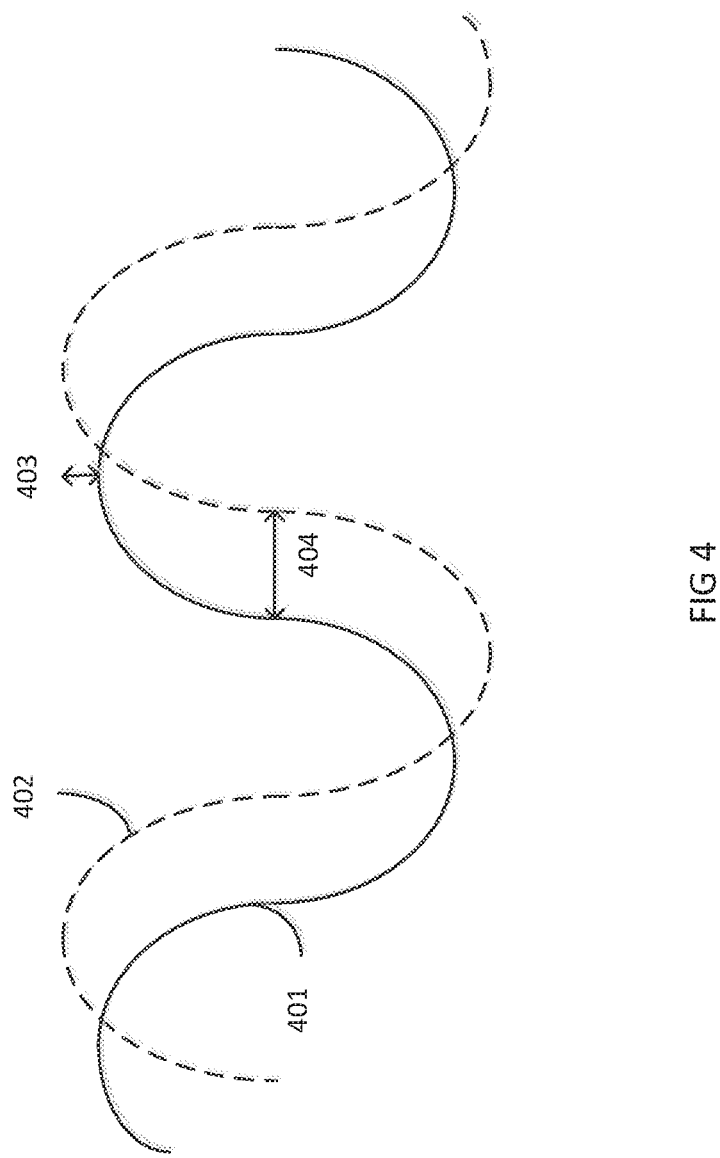
FIG. 4 is a graph illustrating the concept of synchronization of two alternating voltage waves.

FIG. 4 illustrates the concept of synchronization of two alternating voltage/current waves 401 and 402. The wave 401 may represent the output of any of the phases 321, 322, and 323. The wave 402 may represent any of the phases 341, 342, and 343. Before the synchronization between the two waves 401 and 402 is achieved, there is a magnitude difference 403 and/or a phase/frequency difference 404 that should be substantially eliminated before coupling the buses. When the synchronization between the two waves 401 and 402 is achieved, the phase, frequency, and/or amplitude of waves 401 and 402 substantially or completely match (e.g., waves 401 and 402 overlap).

The contactors 334, 335, and 336 will be closed to connect the generator 320 to the source 340 only when the phases 321, 322, and 323 have been synchronized to the phases 341, 342, and 343, respectively. In some embodiments, the lamps 331, 332, and 333 may be used to indicate whether the synchronization has been achieved. Since there is no magnitude, phase, and frequency difference between the generator 320 and the source 340 once the synchronization is achieved, there is no voltage across the switch 330, thereby causing lamps 331, 332, and 333 to not be lit. In some embodiments, indicators other than lamps may be used to detect synchronization.

Figure 5:
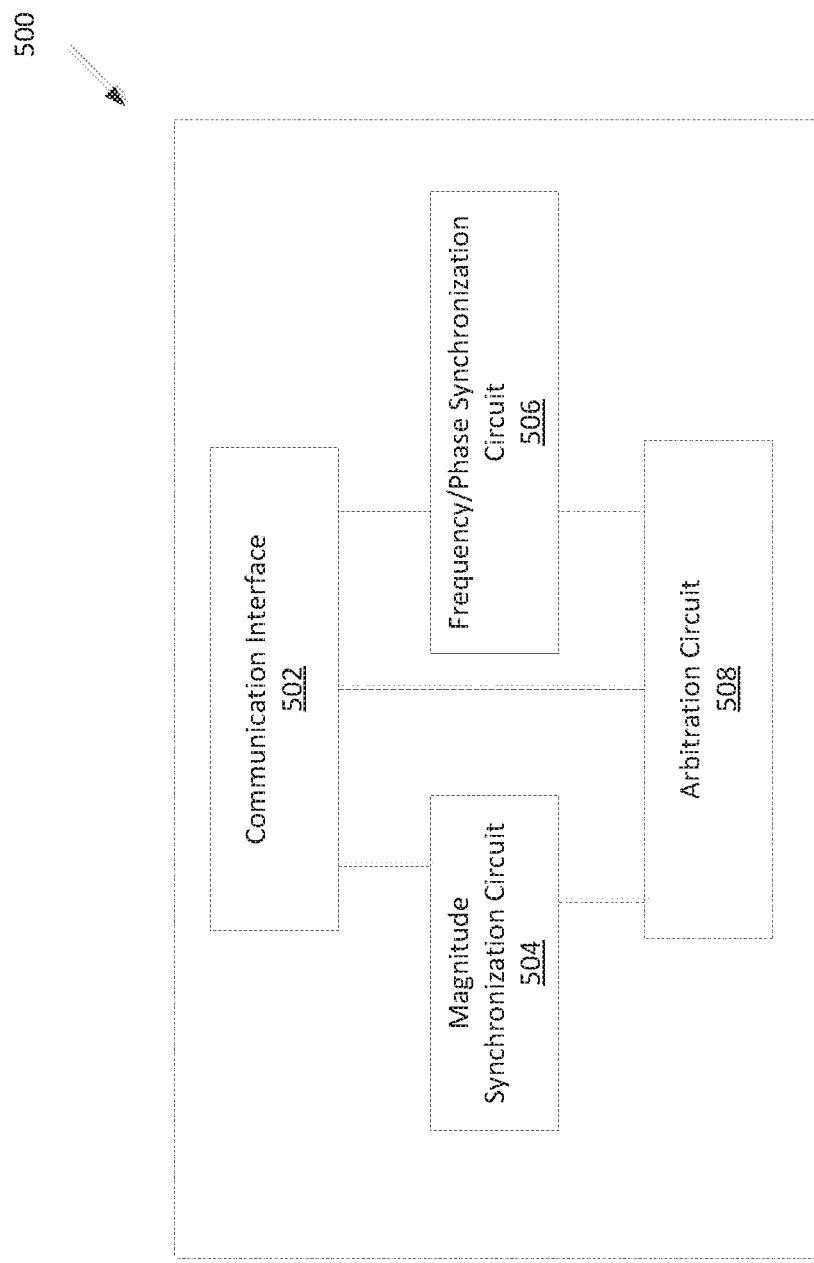
FIG. 5 is a schematic diagram of a synchronizer of a generator set.

Referring to FIG. 5, a synchronizer 500 in a genset is shown. The synchronizer 500 may be used in each of the gensets 211, 212, 213, and 214 of FIG. 2. The synchronizer 500 includes a communication interface 502, a magnitude synchronization circuit 504, a frequency/phase synchronization circuit 506, and, optionally, an arbitration circuit 508. The communication interface 502 may be structured to receive and transmit information for synchronization over the communication network 101. In particular, the communication interface 502 may be structured to receive a synchronization request and data indicating the characteristics of the electrical power to be synchronized to from the master control circuits 221, 222, and 223. The communication interface 502 may be a modem, a network interface card (NIC), a serial interface, a mod bus, a CAN bus, or a wireless transceiver, etc. The communication interface 502 on each genset may be configured to receive the same data regarding characteristics of the electrical power of a source.

Figure 6:
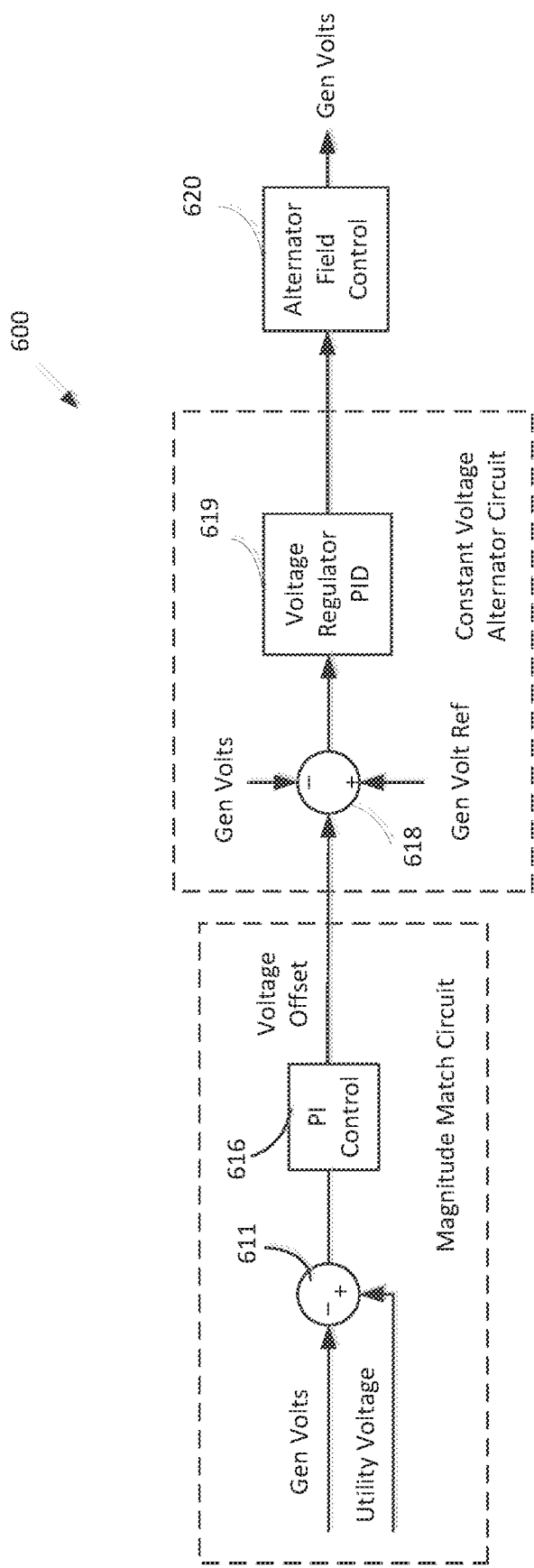
FIG. 6 is a block diagram of a magnitude synchronization circuit in the synchronizer according to a first embodiment.

The magnitude synchronization circuit 504 may be structured to match a magnitude of the output of the genset to a magnitude of the voltage for a source to which to synchronize and directly or indirectly drive an alternate field to match voltages between the output of the genset and the grid voltage. FIG. 6 shows a magnitude synchronization circuit 600 according to some embodiments. The magnitude synchronization circuit 600 includes a comparator 611 structured to compare the magnitude of the output voltage of a genset (e.g., one of the gensets 211, 212, 213, and 214) with the magnitude of the voltage of a source (e.g., a utility voltage or another genset). For a source having a plurality of phases, the comparator 611 may compare the average magnitude of the plurality of phases of the genset with the average magnitude of the plurality of phases of the source. The output of the comparator 611 (e.g., the difference between the magnitudes of the genset output voltage and the source voltage) is fed to a magnitude match proportional integral (PI) loop 616. The magnitude match PI loop 616 may implement a magnitude offset generation process that outputs a magnitude offset based on the output of the comparator 611. In particular, the magnitude match PI loop 616 may continuously attempt to minimize the difference output by the comparator 611 over time by adjustment of the magnitude offset. The magnitude offset may be provided to another comparator 618. The comparator 618 may compare the magnitude of the actual output voltage of the genset with a reference voltage and combine the difference and the magnitude offset output by the magnitude match PI loop. The combination output by the comparator 618 may be provided to an automatic voltage regulator (AVR) proportional integral derivative (PID) 619. The AVR PID 619 may control the excitation voltage applied to a field winding in an alternator of the genset via an alternator field control circuit 620. The level of the field current determines the strength of the magnetic field, thereby determining the magnitude of the output voltage of the genset. The AVR PID 619 may continuously attempt to minimize the output by the comparator 418 over time by adjustment of the excitation voltage. In this manner, the magnitude difference between the genset and the source may be driven to zero or nearly zero. The magnitude synchronization circuit 504 on each genset may be configured to independently calculate the same voltage offset based on the same data received.

Figure 7:
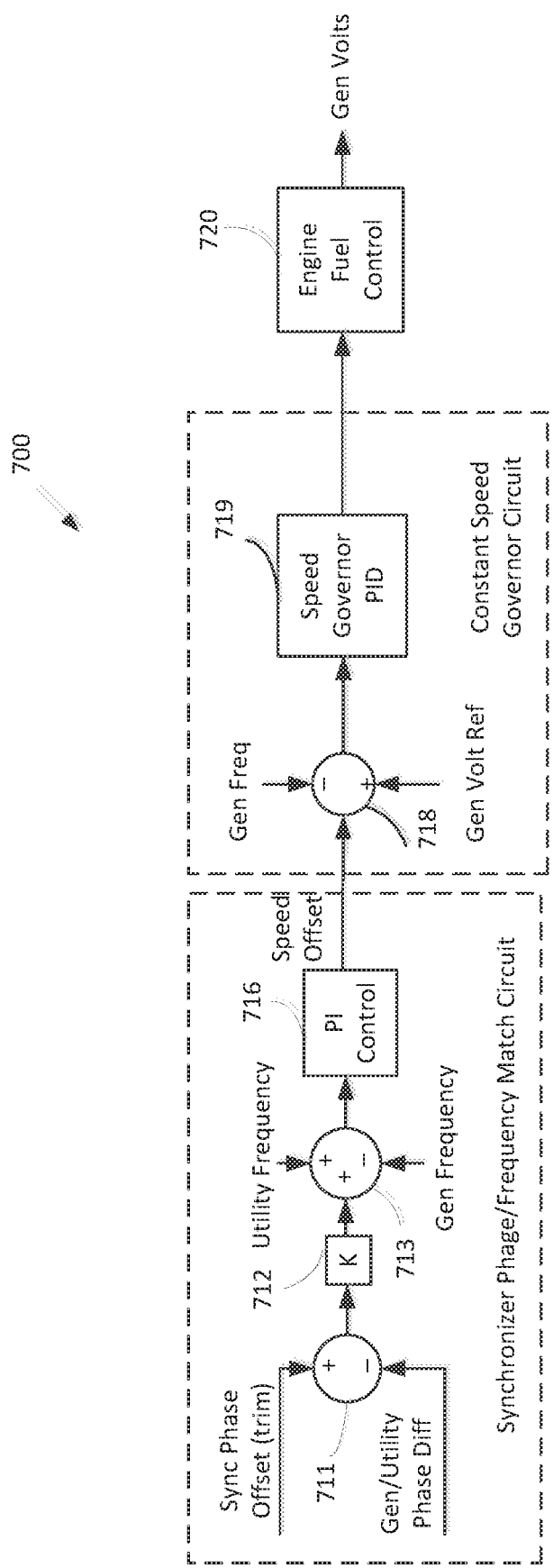
FIG. 7 is a block diagram of a frequency/phase synchronization circuit in the synchronizer according to a first embodiment.

The frequency/phase synchronization circuit 506 may be structured to match a frequency/phase of the output of the genset to a frequency/phase of the power for a source to which to synchronize. FIG. 7 shows a frequency/phase synchronization circuit 700 according to some embodiments. Frequency and phase of the output of a genset may both be changed and synchronized to those of a source by changing a speed of an engine of the genset. In particular, the frequency/phase synchronization circuit 700 may use the frequency/phase differences and whether the output voltage of the genset is leading or lagging the bus voltage to determine whether the engine speed should be increased or decreased and by how much. The frequency/phase synchronization circuit 700 may include a phase comparator 711. A phase difference between the output voltage of the genset and the source voltage may be input to the phase comparator 711. For a source having a plurality of phases, the phase difference is the difference between one phase of the genset and a corresponding phase of the source. In some embodiments, a synchronization phase offset (trim) may also be input to the comparator 711 as a correction factor where there is an offset in the sensing used for the phase difference. In some cases, the synchronization phase offset (trim) is zero. The circuit 700 may also include a constant multiplier 712 structured to trim response and a frequency comparator 713 structured to compare the frequency of the output voltage of the genset with frequency of the source voltage. The frequency difference between the genset and the source may be combined with the frequency offset output by the constant multiplier 712 and fed to a synchronization proportional integral (PI) loop 716. The synchronization PI loop 716 may implement a synchronization phase/frequency match process that outputs a speed offset based on the output of the comparator 713. When the PI loop 716 operates, it responds to the frequency difference and when the frequency is matched, the phase difference is driven to zero or nearly zero. In particular, the PI loop 716 may continuously attempt to minimize the difference output by the constant multiplier 712 over time by adjustment of the speed offset. The speed offset may be provided to a comparator 718. The comparator 718 compares the frequency of the actual output voltage of the genset with the frequency of a reference voltage and combines the difference with the speed offset output by the PI loop 716. The combination output by the comparator 718 is provided to an automatic speed governor proportional-integral-derivative controller (PID) 719. The speed governor PID 719 may be structured to implement a constant speed governor process that changes the speed of the engine of the genset by adjusting the engine fueling through an engine fuel control circuit 720. The speed governor PID 719 may continuously attempt to minimize the output by the comparator 718 over time by adjustment of the engine fueling. In this manner, the frequency and phase of the output voltage of the genset can be matched with those of the source voltage. The frequency/phase synchronization circuit 700 on each genset may be configured to independently calculate the same speed offset based on the same data received.

Figure 8:
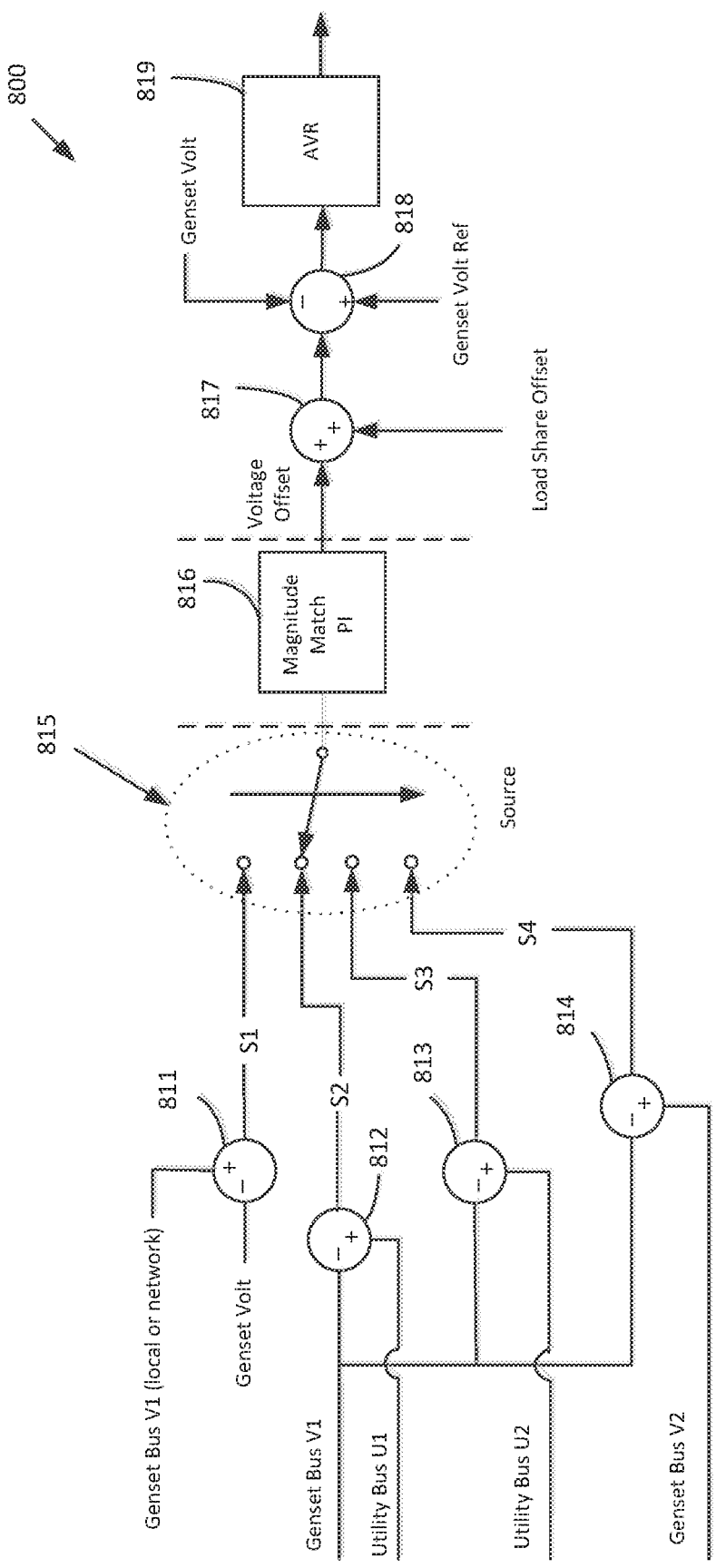
FIG. 8 is a block diagram of a magnitude synchronization circuit in the synchronizer according to a second embodiment.

FIG. 8 shows a magnitude synchronization circuit 800 according to an embodiment. The magnitude synchronization circuit 800 may include comparators 811, 812, 813, and 814, and a selector 815. The magnitude synchronization circuit in the first genset 811 is used as an example to explain how the circuit works for the four scenarios S1, S2, S3, and S4, in some embodiments. The comparator 811 may compare the magnitude of the output voltage of the first genset 211 with the magnitude of the voltage on the first genset bus V1, which may be acquired locally or via the network 101, and output the difference therebetween. The comparator 811 may be used for the scenario S1. The comparator 812 may compare the magnitude of the voltage on the first genset bus V1 with the magnitude of the voltage on the first utility bus U1, which may be received by the communication interface 502 from the first master control circuit 221 via the network 101, and output the difference therebetween. The comparator 812 may be used for the scenario S2. The comparator 813 may compare the magnitude of the voltage on the first genset bus V1 with the magnitude of the voltage on the second utility bus U2, which may be received by the communication interface 502 from the second master control circuit 222 via the network 101, and output the difference therebetween. The comparator 813 may be used for the scenario S3. The comparator 814 may compare the magnitude of the voltage on the first genset bus V1 with the magnitude of the voltage on the second genset bus V2, which may be received by the communication interface 502 from the third master control circuit 223 via the network 101, and output the difference therebetween. The comparator 814 may be used for the scenario S4. Each of the comparators 811, 812, 813, and 814 may be a subtraction circuit, for example, an operational amplifier, or software equivalent. The selector 815 may be structured to select one output from the outputs of the comparators 811, 812, 813, and 814. In some embodiments, the selection may be made by the arbitration circuit 508, which will be discussed in detail below. The selector 815 may be a selection switch. It shall be understood that the selector 815 may be hardwired or digital.

The output of the selected comparator may be fed to a magnitude match proportional integral (PI) loop 816. The magnitude match PI loop 816 may run a PI process that outputs a magnitude offset based on the output of the selected comparator. The magnitude offset may be provided to an adder 817 together with a load share offset received by the communication interface 502 from other gensets over the network 101. In some embodiments, the adder 817 may be an operational amplifier, or software equivalent. The combination of the magnitude offset and the load share offset may be provided as a total offset to a comparator 818. The comparator 818 may compare the magnitude of the actual voltage of the first genset 211 with the magnitude of a reference voltage for the first genset 211 and combine the difference and the total offset output by the adder 817. The combination may be provided to an automatic voltage regulator (AVR) 819. The AVR 419 may be structured to control the excitation voltage applied to a field winding in an alternator of the genset. The level of the field current determines the strength of the magnetic field, thereby determining the magnitude of the output voltage of the genset. It shall be understood that each component of the magnitude synchronization circuit 800 may be implemented as software, hardwired circuit, or any combination thereof.

Figure 9:
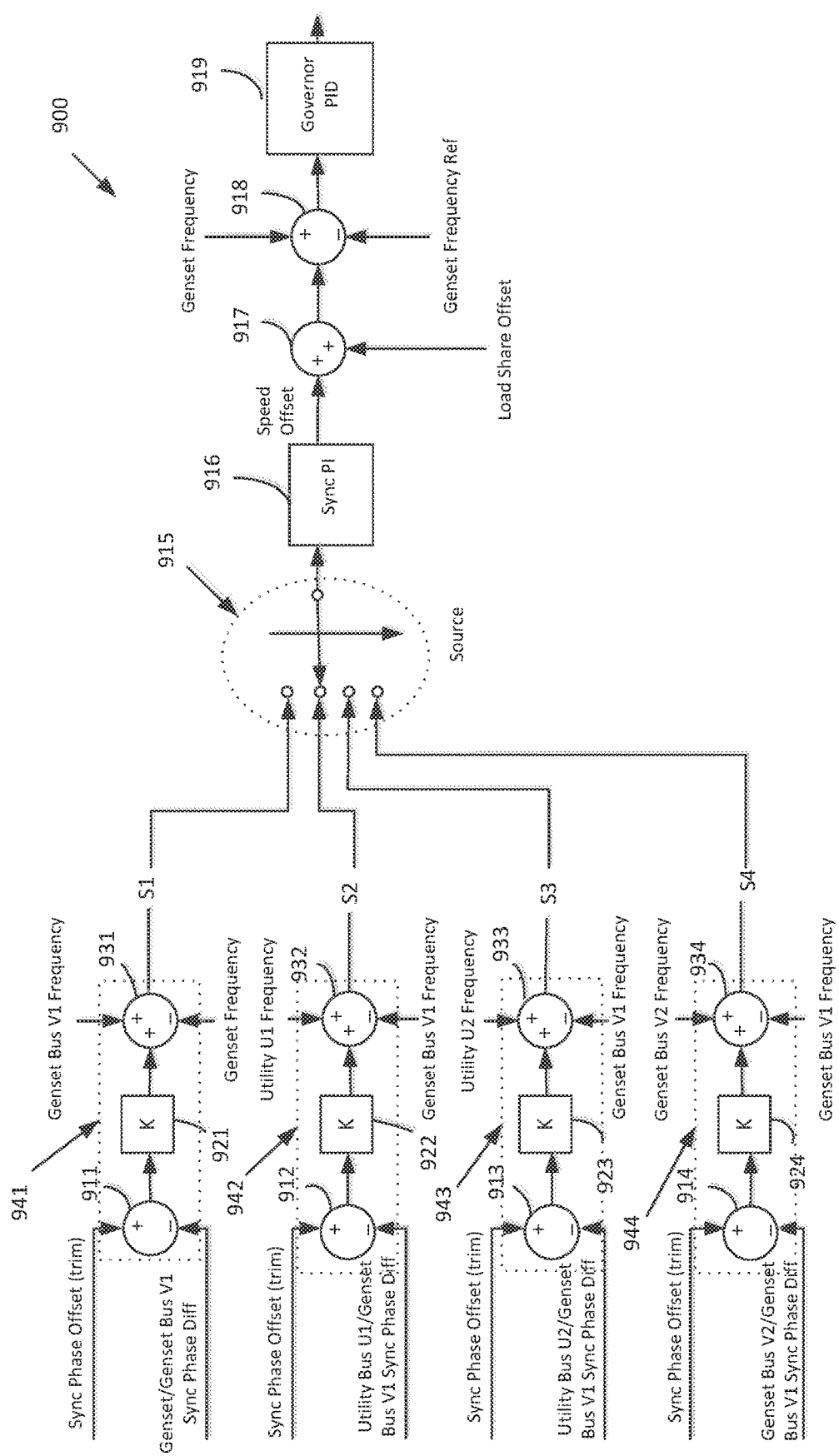
FIG. 9 is a block diagram of a frequency/phase synchronization circuit in the synchronizer according to a second embodiment.

Referring to FIG. 9, a frequency/phase synchronization circuit 900 is shown according to a second embodiment. The frequency/phase synchronization circuit 900 may include comparators 941, 942, 943, and 944, and a selector 915. The frequency/phase synchronization circuit in the first genset 211 is used as an example here to explain how the circuit works for the four scenarios S1, S2, S3, and S4. The first comparator 941 may have four inputs: a synchronization phase offset (trim), a phase difference between the output voltage of the first genset 211 and the voltage on the first genset bus V1, a frequency of the output voltage of the first genset 211, and a frequency of the voltage on the first genset bus V1. In some embodiments, the comparator 941 may include a phase comparator 911 structured to compare the synchronization phase offset (trim) with the phase difference between the output voltage of the first genset 211 and the voltage on the first genset bus V1 and output the difference therebetween. The phase comparator 911 may be a subtraction circuit, for example, an operational amplifier, or software equivalent. The comparator 941 may also include a constant multiplier 921 structured to trim response. The comparator 941 may further include a frequency comparator 931 that compares the frequency of the output voltage of the first genset 211 with frequency of the voltage on the first genset bus V1, combines the frequency difference therebetween with the frequency offset output by the constant multiplier 921, and outputs the combined frequency offset. The first comparator 941 may be used for the scenario S1.

The second comparator 942 may have the same structure as the first comparator 941, including a phase comparator 912, a converter 922, and a frequency comparator 932. The four inputs for the comparator 942 are: the synchronization phase offset (trim), a phase difference between the voltage on the first utility bus U1 and the voltage on the first genset bus V1, a frequency of the voltage on the first utility bus U1, and a frequency of the voltage on the first genset bus V1. The phase difference between the voltage on the first utility bus U1 and the voltage on the first genset bus V1, the frequency of the voltage on the first utility bus U1, and the frequency of the voltage on the first genset bus V1 may be obtained by the communication interface 502 from the first master control circuit 221 via the network 101. The second comparator 942 may be used for the scenario S2.

The third comparator 943 may have the same structure as the first comparator 941 and the second comparator 942, including a phase comparator 913, a converter 923, and a frequency comparator 933. The four inputs for the comparator 943 are: the synchronization phase offset (trim), a phase difference between the voltage on the second utility bus U2 and the voltage on the first genset bus V1, a frequency of the voltage on the second utility bus U2, and a frequency of the voltage on the first genset bus V1. The phase difference between the voltage on the second utility bus U2 and the voltage on the first genset bus V1, the frequency of the voltage on the second utility bus U2, and the frequency of the voltage on the first genset bus V1 may be obtained by the communication interface 502 from the second master control circuit 222 via the network 101. The third comparator 943 may be used for the scenario S3.

The fourth comparator 944 may have the same structure as the first comparator 941, the second comparator 942, and the third comparator 943, including a phase comparator 914, a converter 924, and a frequency comparator 934. The four inputs for the comparator 944 are: the synchronization phase offset (trim), a phase difference between the voltage on the second genset bus V2 and the voltage on the first genset bus V1, a frequency of the voltage on the second genset bus V2, and a frequency of the voltage on the first genset bus V1. The phase difference between the voltage on the second genset bus V2 and the voltage on the first genset bus V1, the frequency of the voltage on the second genset bus V2, and the frequency of the voltage on the first genset bus V1 may be obtained by the communication interface 502 from the third master control circuit 223 via the network 101. The fourth comparator 944 may be used for the scenario S4.

The selector 915 may select one output from the outputs of the comparators 941, 942, 943, and 944. In some embodiments, the selection may be made by the arbitration circuit 508, which will be discussed in detail below. The selector 915 may be a selection switch. It shall be understood that the selector 915 may be hardwired or digital. The output of the selected comparator may be fed to a synchronization proportional integral (PI) loop 916. The synchronization PI loop 916 may be structured to run a PI process that outputs a speed offset based on the output of the selected comparator. The speed offset may be provided to an adder 917 together with a load share offset received by the communication interface 502 from other gensets via the network 101. In some embodiments, the adder 917 may be an operational amplifier, or software equivalent. The combination of the speed offset and the load share offset may be provided as a total offset to a comparator 918. The comparator 918 may compare the frequency of the actual voltage of the first genset 211 with the frequency of a reference voltage for the first genset 211 and combine the difference and the total offset output by the adder 917. In some embodiments, if synchronizing or load sharing is not required, the genet may run at a frequency specified by the genset frequency reference. The combination output by the comparator 918 may be provided to an automatic governor proportional-integral-derivative controller (PID) 919. The governor PID 919 may be structured to change the speed of the engine of the genset to alter the frequency and phase of the output voltage of the genset to an appropriate electrical frequency (i.e., 50 or 60 Hz) and phase. It shall be understood that each component of the frequency/phase synchronization circuit 900 may be implemented as software, hardwired circuit, or any combination thereof.

In the system as described above in combination with FIGS. 1 through 9, each genset may obtain data regarding the utility bus/genset bus voltage from appropriate nodes on the network, for example, master control circuits 221, 222, and 223. Genset(s) may use the information as feedback for the single set synchronizing process on the genset(s). Thus, a separate master synchronizer is not needed, and it avoids tuning the PI control loop the master synchronizer contains. For the situation in which a group of paralleled gensets are used to provide power, the group may need to be synchronized to a same source. However, different gensets in the group may receive synchronization requests from different master control circuits for synchronizing to different sources. In some embodiments, the synchronizer on each genset may include an arbitration circuit for collectively deciding a same source to synchronize to.

Figure 10:
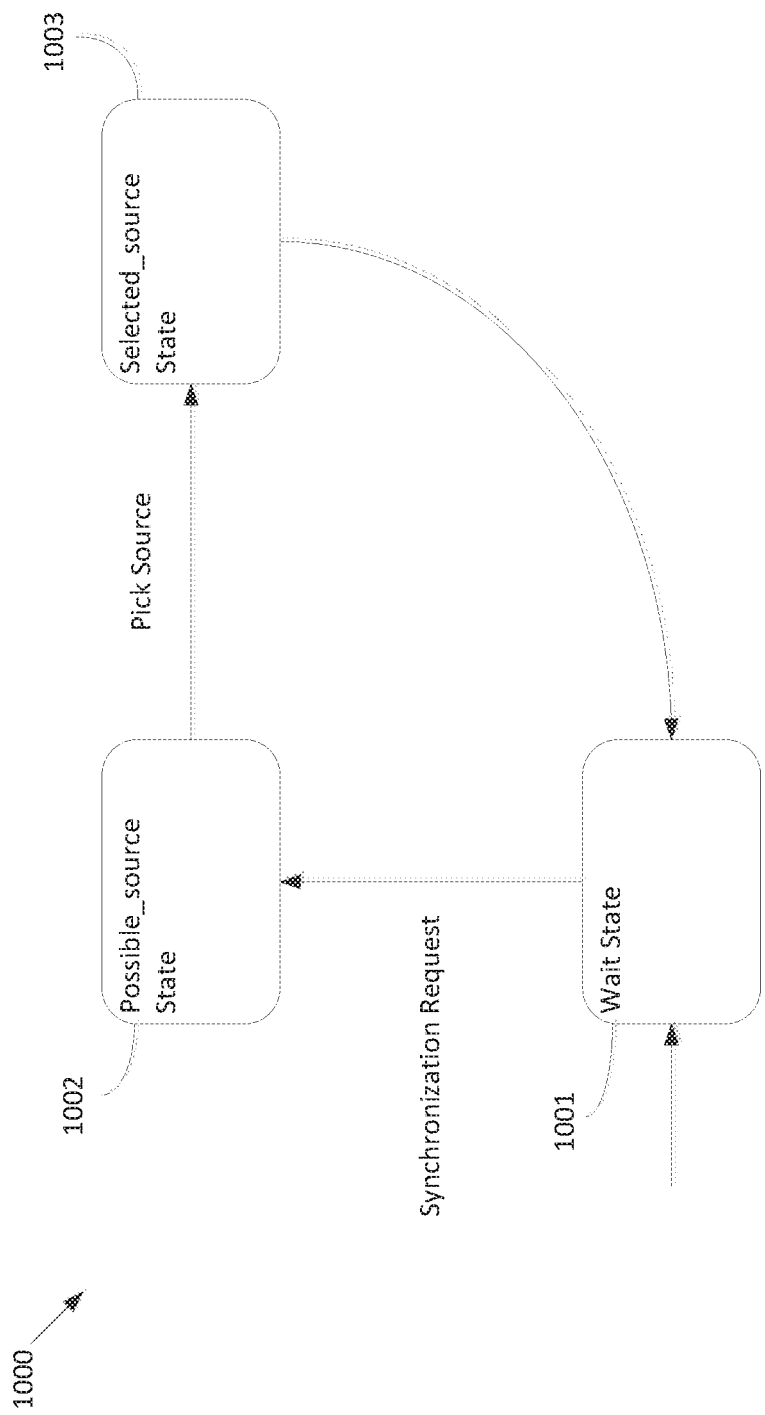
FIG. 10 is a schematic diagram of a state machine in an arbitration circuit of a generator set.

Referring to FIG. 10, a state machine 1000 used, in some embodiments, in the arbitration circuit 508 of FIG. 5 is shown. An identical state machine may operate in each of the gensets 211, 212, 213, and 214, in some embodiments. In some embodiments, the state machine 1000 may include dedicated circuitry structured to implement the arbitration process. In other embodiments, the state machine 1000 may include machine-readable content for implementing the arbitration process. In yet other embodiments, the state machine 1000 may include any combination of circuitry components and machine-readable content. The state machine 1000 may begin with a Wait state 1001. When the genset (e.g., the first genset 211) that hosts the state machine 1000 receives a synchronization request from a master control circuit, the state machine 1000 may transition to the Possible_source state 1002 and may ignore other sync requests coming in later. The synchronization request may identify a source to synchronize to. The synchronizer may broadcast the source identified in the synchronization request to the other gensets (e.g., the gensets 212, 213, and 214) over the network 101. While in the Possible_source state 1002, the state machine 1000 operating in each of the gensets 211, 212, 213, and 214 may monitor the other gensets for potential sources the other gensets might synchronize to. When all the gensets 211, 212, 213, and 214 each have a potential source to synchronize to, the state machine 1000 in each genset may transition to the Selected_source state 1003. At the Selected_source state 1003, each genset may have a list of all gensets and sources identified in the synchronization requests the gensets have received. The gensets may collectively select one from the sources in the list as the source for all the gensets to synchronize to. In some embodiments, the source associated with the genset of highest network address (e.g., IP address) may be selected. When the source is selected, the synchronizer 500 on each genset may turn the selectors 815 and 915 to a position corresponding to the selected source. The magnitude synchronization circuit 800 and the frequency/phase synchronization circuit 900 may operate to match the output voltage of the genset to the source. When the differences of the magnitude/frequency/phase between the output voltage and the source are within predetermined tolerances, the synchronizer 500 may decide that synchronization is completed, and the synchronization request may be removed from each genset. The request may also be removed when fault occurs or for other reasons. Then the state machine 1000 on each genset may return to the Wait state 1001. When another synchronization request comes in a genset, the state machine 1000 on the genset may again proceed to the Possible_source state 1002 and the process repeats.

Figure 11:
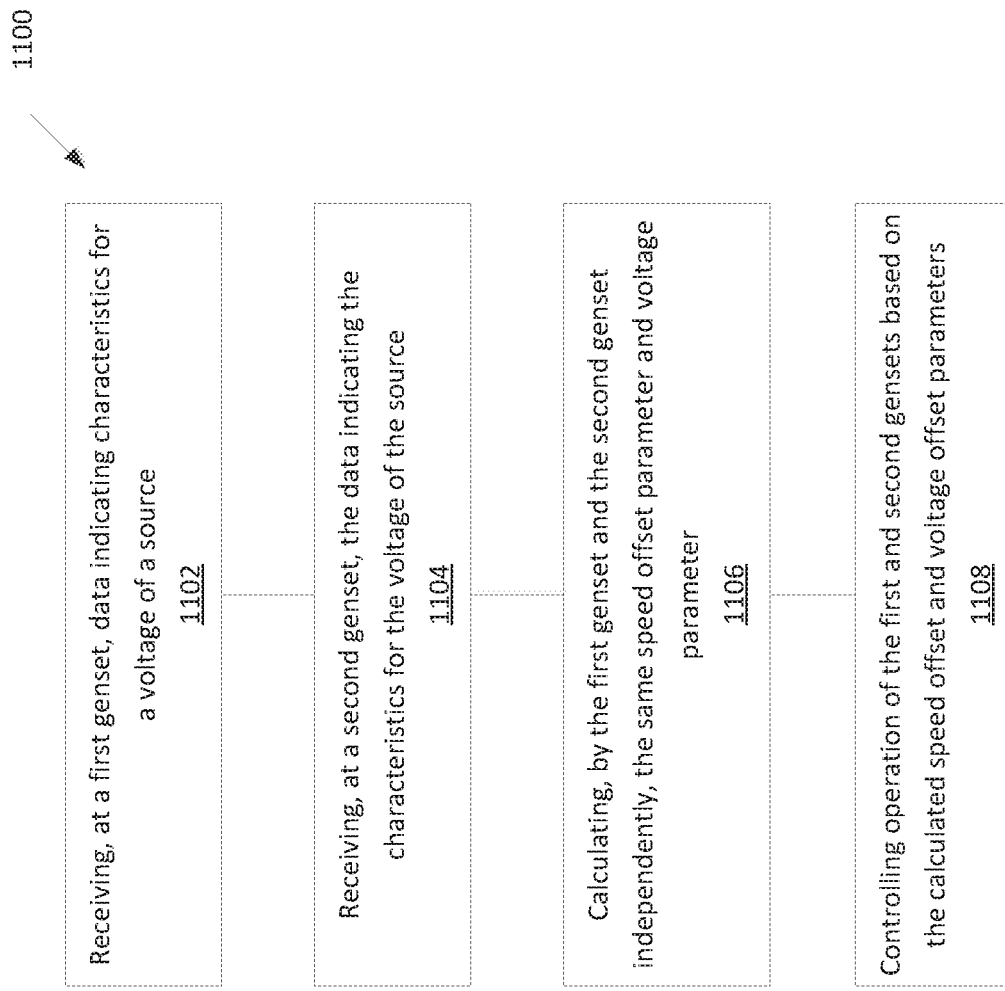
FIG. 11 is a flow chart of a synchronization method performed by the synchronizer.

Referring to FIG. 11, a flow chart 1100 of a synchronization method is shown according to an exemplary embodiment. The flow chart may be implemented on the synchronizer shown in FIG. 5. At an operation 1102, the communication interface 502 of the synchronizer 500 on a first genset of a plurality of gensets connected to one or more sources receives data indicating characteristics of a voltage for a source. In some embodiments, the characteristics include at least one of a magnitude, a phase, or a frequency of a voltage for the source. In some embodiments, the source may include a plurality of phases, and the characteristics may include at least one of the magnitude, the phase, or the frequency of one of the plurality of phases.

At an operation 1104, the communication interface 502 of the synchronizer 500 on a second genset (different than the first genset) of the plurality of gensets receives the same data indicating the characteristics of the electrical voltage for the source.

At an operation 1106, each of the first and second generator sets calculates a speed offset parameter and a voltage offset parameter based on the received data. The first and the second generator sets independently calculate the same speed offset parameter and voltage offset parameter based on the same data received.

At an operation 1108, the synchronizers 500 on each of the first and second gensets control operation of the first and second gensets based on the calculated speed offset and voltage offset parameters. In particular, in some embodiments, the voltage offset parameter is fed to a first proportional integral (PI) loop which provides an output as an offset to an automatic voltage regulator (AVR) of the generator set. The speed offset is fed to a second proportional integral (PI) loop which provides an output to a governor proportional-integral-derivative controller (PID) of the generator set. The output voltage is compared with the voltage of the source. Synchronization is determined completed if a first difference between the magnitude of the output voltage and the magnitude of the voltage of the source is within a first predetermined tolerance of difference, a second difference between the frequency of the output voltage and the frequency of the voltage of the source is within a second predetermined tolerance of difference, and a third difference between the phase of the output voltage and the phase of the voltage of the source is within a third predetermined tolerance of difference.

Figure 12:
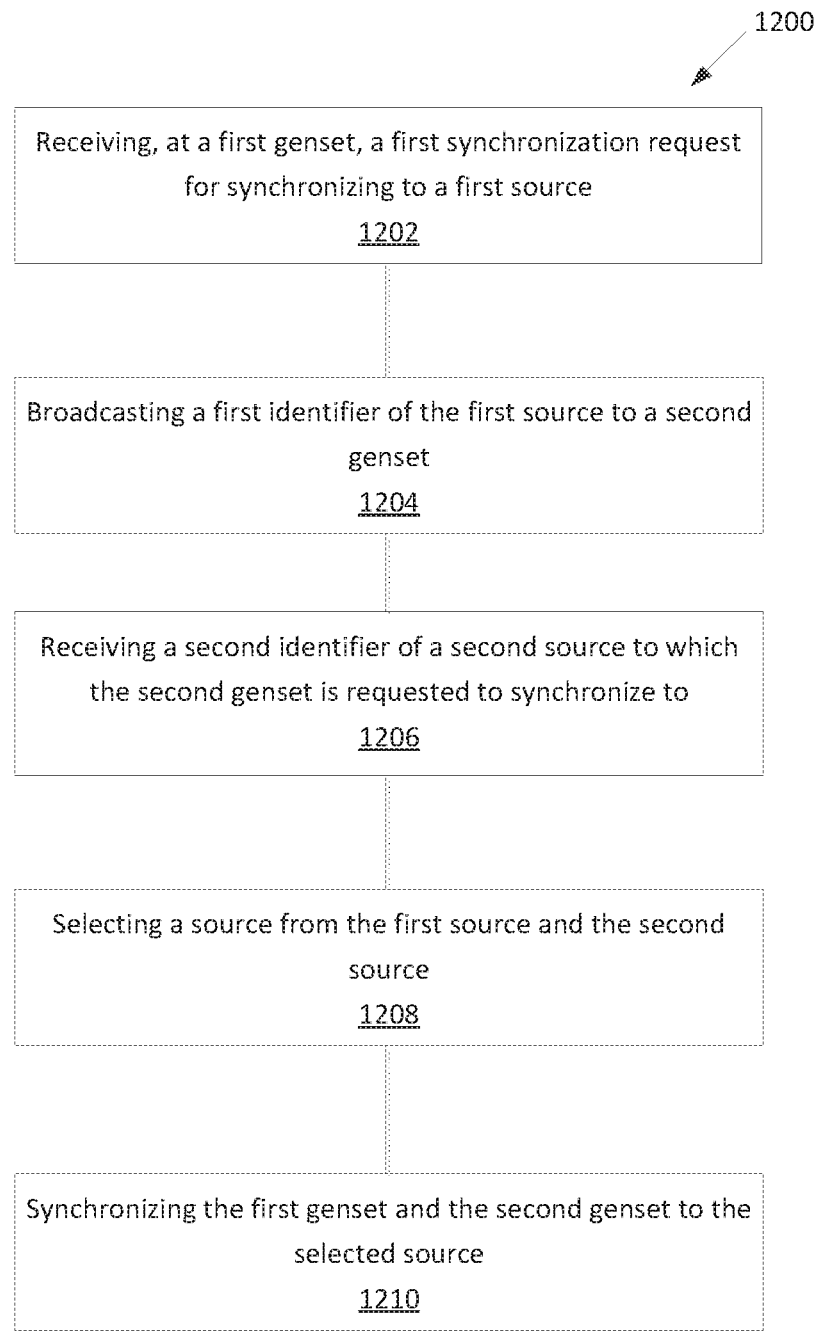
FIG. 12 is a flow chart of a synchronization method with a source arbitration scheme performed by the synchronizer.

Referring to FIG. 12, a flow chart 1200 of a source arbitration method is shown according to an exemplary embodiment. The flow chart may be implemented on the synchronizer shown in FIG. 5. At an operation 1202, the communication interface 502 at a first generator set (e.g., genset 211) of the group receives a first synchronization request for synchronizing a first output of the first generator set to a first voltage of a first source. In some embodiments, the first synchronizer request is for synchronizing to the voltage on the first genset bus V1. In some embodiments, the first synchronization request is received from the circuit breaker controller 221 for synchronizing to the voltage on the first utility U1 over the network 101. In some embodiments, the first synchronization request is received from the circuit breaker controller 222 for synchronizing to the voltage on the second genset bus V2. In some embodiments, the first synchronization request is received from the circuit breaker controller 223 for synchronizing to the voltage on the second utility bus U2.

At an operation 1204, the communication interface 502 at the first generator set broadcasts a first identifier of the first source to at least a second genset (e.g., gensets 212, 213, and 214) of the group. In some embodiments, each of the other gensets (e.g., gensets 212, 213, and 214) of the group receives a synchronization request for synchronizing to a source and broadcasts the source. The number of the second gensets can be any suitable number.

At an operation 1206, the communication interface 502 at the first generator set receives a second identifier of a second source from the second generator set (e.g., gensets 212, 213, and 214). The second generator set has received a second synchronization request for synchronizing a second output voltage of the second generator set to a second voltage of the second source. In some embodiments, each genset keeps a list of all gensets and sources identified in the synchronization requests the gensets have received.

At an operation 1208, the gensets collectively select one from the first source and the second source as the source for all the gensets to synchronize to. In some embodiments, the gensets collectively select one from the sources in the list. In some embodiments, the source associated with the genset of highest network address (e.g., IP address) may be selected. In some embodiments, when the source is selected, the synchronizer 500 on each genset may turn the selectors 815 and 915 to correspond to the selected source.

At an operation 1210, the synchronizer 500 of each paralleled genset matches the output voltage to the voltage of the selected source. In some embodiments, the magnitude synchronization circuit 504 matches a magnitude of the output voltage to the magnitude of the voltage of the source, the frequency/phase synchronization circuit 506 matches a frequency of the output voltage to the frequency of the voltage of the selected source, and a phase of the output voltage to the phase of the voltage of the selected source.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

While this specification contains specific implementation details, these should not be construed as limitations on the scope of any inventions or of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer), partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method of synchronization, comprising:
receiving, at a first generator set, data indicating a characteristic for a component of a voltage for a source;
receiving, at a second generator set, the data indicating the characteristic for the component of the voltage for the source;
calculating, by each of the first and second generator sets, a speed offset parameter and a voltage offset parameter based on the received data, the first and second generator sets configured to receive the same data indicating the component of the voltage for the source and independently calculate the speed offset parameter and the voltage offset parameter based on the same data indicating the component of the voltage for the source; and
controlling operation of the first and second generator sets based on the calculated speed offset and voltage offset parameters,
wherein the calculating the speed offset parameter comprises
generating the speed offset parameter based on a frequency and a phase of the voltage for the source and a frequency and a phase of an output voltage of the first generator set for the first generator set using a speed proportional integral loop of the first generator set,
wherein the calculating the voltage offset parameter comprises
generating the voltage offset parameter based on a magnitude of the voltage for the source and a magnitude of the output voltage of the first generator set using a magnitude proportional integral loop of the first generator set, and
wherein the controlling the operation of the first generator set comprises
controlling the magnitude of the output voltage of the first generator set based on the voltage offset parameter, the magnitude of the output voltage of the first generator set, and a reference magnitude using a voltage regulator proportional-integral-derivative controller of the first generator set.

2. The method of claim 1, wherein the characteristic for the component of the voltage for the source comprises at least one of the magnitude, the phase, or the frequency of the voltage for the source.

3. The method of claim 1, wherein the source comprises a plurality of phases, and wherein the characteristic for the component of the voltage for the source comprises at least one of a magnitude, a phase, or a frequency of each of the plurality of phases.

4. The method of claim 1, wherein the source comprises a plurality of phases, and wherein the characteristic for the component of the voltage for the source comprises at least one of a magnitude, a phase, or a frequency of a single phase of the plurality of phases.

5. The method of claim 1, wherein the source comprises a utility grid.

6. The method of claim 1, further comprising:
receiving the data from a node over a network;
comparing, by a controller located on the node, the output voltage of the first generator set with the received data; and
selectively closing or opening a first circuit breaker, by the controller, to connect or disconnect the first generator set to the source based on the comparison of the output voltage of the first generator set with the received data.

7. The method of claim 6, further comprising:
comparing, by the controller, an output voltage of the second generator set with the received data; and
selectively closing or opening a second circuit breaker, by the controller, to connect or disconnect the second generator set to the source based on the comparison of the output voltage of the second generator set with the received data.

8. The method of claim 1, wherein the controlling the operation of the first generator set further comprises:
controlling a speed of an engine of the first generator set based on the speed offset parameter, the frequency of the output voltage of the first generator set, and a reference frequency using a governor proportional-integral-derivative controller of the first generator set.

9. A method of synchronizing a group of paralleled generator sets, comprising:
receiving, at a first generator set of the group, a first synchronization request for synchronizing a first output of the first generator set to a first voltage component of a first source;
broadcasting, at the first generator set, a first identifier of the first source to at least a second generator set of the group;
receiving, at the first generator set, a second identifier of a second source from the second generator set, wherein the second generator set has received a second synchronization request for synchronizing a second output of the second generator set to a second voltage component of the second source;
selecting, at the first generator set, a source from the first source and the second source based on a characteristic of the first generator set and the second generator set; and
synchronizing the first output of the first generator set and the second output of the second generator set to the selected source.

10. The method of claim 9, wherein the first source comprises a first voltage bus on a power grid, and wherein the second source comprises a second voltage bus on the power grid.

11. The method of claim 9, wherein receiving the first synchronization request comprises receiving the first synchronization request from a first node over a network, and wherein receiving the second synchronization request comprises receiving the second synchronization request from a second node over the network.

12. The method of claim 9, wherein selecting the source from the first source and the second source comprises selecting a generator set from the first generator set and the second generator set that has a higher address, and selecting the source that is associated with the selected generator set.

13. The method of claim 9, further comprising:
receiving, at the first generator set, data indicating a magnitude, a frequency, and a phase of a voltage for the selected source;

receiving, at the second generator set, the data indicating the magnitude, the phase, and the frequency of the voltage for the selected source;

calculating, by each of the first and second generator sets, a speed offset parameter and a voltage offset parameter based on the received data, the first and second generator sets configured to receive the same magnitude, phase, and frequency of the voltage for the selected source and independently calculate the speed offset parameter and the voltage offset parameter based on the same received data; and controlling operation of the first and second generator sets based on the calculated speed offset and voltage offset parameters.

14. The method of claim 13, wherein the calculating the speed offset parameter comprises:

generating the speed offset parameter based on the frequency and the phase of the voltage for the selected source and a frequency and a phase of an output voltage of the first generator set using a speed proportional integral loop of the first generator set.

15. The method of claim 9, wherein the first source and the second source comprise a plurality of phases, and wherein a first electrical power component and a second electrical power component comprise at least one of a magnitude, a phase, or a frequency of one or more of the plurality of phases.

16. A generator set comprising:

a communication interface configured to receive, over a network, a synchronization request for synchronizing an output voltage of the generator set to a voltage of a first source, and data indicating a magnitude, a frequency, and a phase of the voltage of the first source;

a magnitude synchronization circuit configured to calculate a voltage offset parameter based on the received data and to control operation of the generator set based on the calculated voltage offset parameter; and a frequency/phase synchronization circuit configured to calculate a speed offset parameter based on the received data and to control the operation of the generator set based on the calculated speed offset parameter, wherein the received data is transmitted to one or more other generator sets connected in parallel with the generator set and each of the one or more other generator sets configured to calculate the speed offset and the voltage offset using the same received data, and wherein the magnitude synchronization circuit comprises:

a magnitude proportional integral loop configured to process the magnitude of the voltage of the first source and a magnitude of the output voltage of the generator set to generate the voltage offset parameter; and an automatic voltage regulator configured to process the voltage offset parameter, the magnitude of the output voltage of the generator set, and a reference magnitude to control the magnitude of the output voltage.

17. The generator set of claim 16, wherein the communication interface comprises at least one of a modem, a network interface card, and a wireless transceiver.

18. The generator set of claim 16, wherein the frequency/phase synchronization circuit comprises:

a speed proportional integral loop configured to process the frequency and the phase of the voltage of the first source and a frequency and a phase of the output voltage of the generator set to generate the speed offset parameter; and a governor proportional-integral-derivative controller configured to process the speed offset parameter, the frequency of the output voltage of the generator set, and a reference frequency to control a speed of an engine of the generator set.

19. The generator set of claim 18, wherein the generator set is in a group of paralleled generator sets, and wherein the communication interface is further structured to:

broadcast a first identifier of the first source to at least a second generator set of the group; and receive a second identifier of a second source from the second generator set, wherein the second generator set has received a second synchronization request for synchronizing a second output voltage of the second generator set to a second voltage of the second source;

the generator set further comprising an arbitration circuit configured to:

select a source from the first source and the second source to which to synchronize the generator set.

20. The generator set of claim 19, wherein selecting the source from the first source and the second source comprises selecting a generator set from the first generator set and the second generator set that has a higher address, and selecting the source that is associated with the selected generator set.

* * * * *